US00RE36400E

United States Patent [19]

Letson

[11] E Patent Number: Re. 36,400

[45] Reissued Date of Patent: Nov. 23, 1999

[54] PAIR OF HANDLES FOR A PLIERS

[75] Inventor: Marshall G. Letson, Mt. Carmel, Ill.

[73] Assignee: Snap-on Technologies, Inc., Lincolnshire, Ill.

[21] Appl. No.: 29/040,532

[22] Filed: Jun. 21, 1995

Related U.S. Patent Documents

Reissue of:

[64] Patent No.: Des. 343,999
Issued: Feb. 8, 1994
Appl. No.: 29/002,777
Filed: Dec. 21, 1992

[51] LOC (6) Cl. ..... 08-05

[52] U.S. Cl. ..... D8/107; D8/52

[58] Field of Search ..... D8/51, 52, 14, D8/54, 55; D24/148, 153; 81/415, 416, 417, 302, 324, 381

[56] References Cited

U.S. PATENT DOCUMENTS

| | | | |
|---|---|---|---|
| D. 282,777 | 2/1986 | Kurz | D8/52 |
| D. 283,841 | 5/1986 | Kurz | D8/52 |
| D. 296,822 | 7/1988 | Fenton | D8/52 |
| D. 298,008 | 10/1988 | Kim | D8/52 |
| 3,521,510 | 7/1970 | Angguist | 81/417 |
| 3,583,264 | 6/1971 | Brunosson | 81/415 |
| 4,099,315 | 7/1978 | Pudenz | 81/416 |
| 4,185,523 | 1/1980 | Kreitz | 81/417 |
| 4,414,868 | 11/1983 | Puro | 81/416 |

OTHER PUBLICATIONS

Contact East Catalog, 1985, p. 31, Utica Brand Long Chain Nose Pliers.
Suburu Pliers.

*Primary Examiner*—Philip S. Hyder
*Attorney, Agent, or Firm*—Emrich & Dithmar

[57] CLAIM

The ornamental design for a [pliers] *pair of handles for a pliers*, as shown and described.

DESCRIPTION

1 Claim, 1 Drawing Sheet

Figure 1:
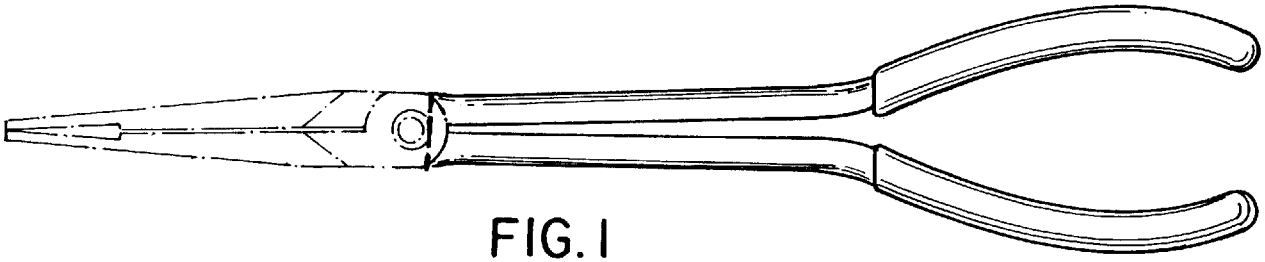
FIG. 1 is a top plan view of a [pliers] *pair of handles for a pliers* showing my new design with the tool jaws closed, the bottom plan view being a mirror image thereof[;], *the portion in phantom forming no portion of my design;*
Figure 2:
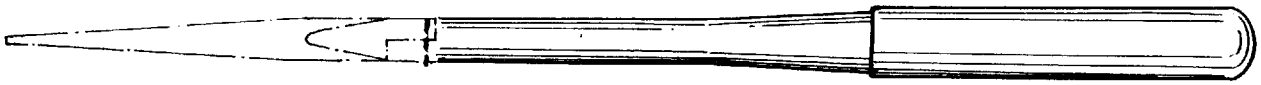
FIG. 2 is a front elevational view thereof, the rear elevational view being a mirror image thereof, *the portion in phantom forming no portion of my design;*
Figure 3:
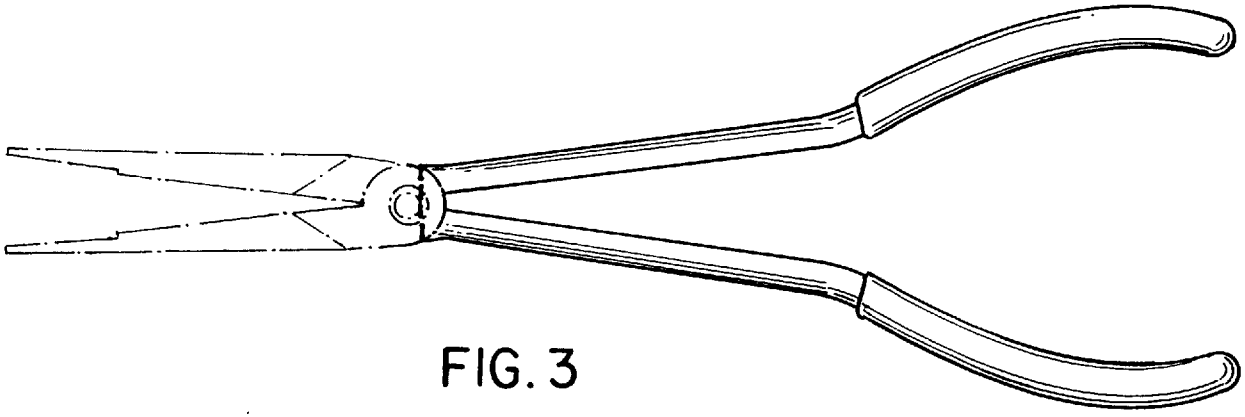
FIG. 3 is a top plan view thereof with the tool jaws open, the bottom plan view being a mirror image thereof, *the portion in phantom forming no portion of my design*.
Figure 4:
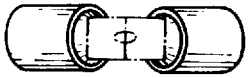
FIG. 4 is a side elevational view thereof as viewed from the left-hand side of FIG. 2 *the portion in phantom forming no portion of my design*; and, FIG. 5 is a side elevational view thereof, as viewed from the right-hand side of FIG. 2.
Figure 5:
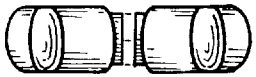

Matter enclosed in heavy brackets [ ] appears in the original patent, but forms no part of this reissue; matter printed in italics indicates the additions made by reissue.